United States Patent

Bono et al.

[11] Patent Number: 5,308,097
[45] Date of Patent: May 3, 1994

[54] MECHANISM TO CONVERT THE FRONT IDLE WHEELS OF BICYCLES IN GENERAL INTO DRIVE WHEELS

[76] Inventors: Francesco Bono, S.S.22, n°16, San Rocco di Bernezzo; Paolo Garelli, Frazione Roata Chiusani Centallo; Luigi Lerda, Corso Romita, 122 Busca, both of Cuneo, all of Italy

[21] Appl. No.: 874,172

[22] Filed: Apr. 24, 1992

[30] Foreign Application Priority Data

Nov. 6, 1991 [IT] Italy ............................ 91 A 000 844

[51] Int. Cl.⁵ .............................................. B62M 1/12
[52] U.S. Cl. ...................................... 280/234; 280/246
[58] Field of Search ............ 280/234, 233, 230, 242.1, 280/244, 246

[56] References Cited

U.S. PATENT DOCUMENTS

| 682,953 | 9/1901 | Norton | 280/233 X |
|---|---|---|---|
| 4,726,600 | 2/1988 | Wu | 280/234 |

FOREIGN PATENT DOCUMENTS

| 2436774 | 12/1976 | Fed. Rep. of Germany | 280/233 |
| 0863599 | 4/1941 | France | 280/234 |
| 0907577 | 3/1946 | France | 280/233 |
| 1017159 | 12/1952 | France | 280/234 |
| 9107308 | 5/1991 | PCT Int'l Appl. | 280/233 |

Primary Examiner—Margaret A. Focarino
Assistant Examiner—Peter C. English
Attorney, Agent, or Firm—Fiddler Levine & Mandelbaum

[57] ABSTRACT

A mechanism temporarily convert the front wheel of bicycles into a driving wheel, comprising a lever (5) hinged in front of and on top of the frame; the handlebar (E) is fixed to the lever together with a catch (14), with a mobile stopping tooth which cooperates with stopping means (11, 15) attached to the steering column (10), to block/release the handlebar which can be swung on a vertical plane; a transmission assembly, comprising a chain (7) which engages a free wheel (8) coaxial and fixed to the front wheel (I), transmits the alternate movement given to the handlebar to the free wheel; elastic return means for returning the handlebar to the original position are also provided. Control means (16, 17) for the stopping tooth of the catch (14) are attached to the handlebar.

8 Claims, 5 Drawing Sheets

MECHANISM TO CONVERT THE FRONT IDLE WHEELS OF BICYCLES IN GENERAL INTO DRIVE WHEELS

The invention concerns a lever mechanism, fixed to the handlebar and hinged to the front fork, which converts the front idle wheel of bicycles in general into drive wheels by means of the movement of the cyclist's arms.

Some mechanisms are known which provide for the swinging movement of the handlebar or a second lever which transmits torque to the front wheel of the bicycle. The mechanisms known to date are cumbersome considerably increase the weight of the bicycle, alter its appearance, and are therefore scarcely used.

The purpose of the invention is to supply a less clumsy, light weight mechanism, which can easily be set into motion or neutralized and which can be applied to any type of bicycle, constructed in such a way as to leave the overall appearance unaltered.

The mechanism can be advantageously used on bicycles in general, particularly if these are to be ridden not only on roads having an asphalt or hard earth surface but also on off-the-road journeys for which, as is known, special bicycles called "mountain-bikes" are used.

The mechanism is characterized by the fact that it comprises a lever hinged to the front fork and having its top fixed to the handlebar which can be swung on the vertical plane, and transmission means for the alternating motion of the handlebar to the front wheel.

More specifically, the driven part of at least one free wheel is solidly fixed to the front wheel, the driving crown of said free wheel being engaged by a chain, one end of which is connected to a return spring while the opposite end is connected to the extremity of said lever fixed to the handlebar, which can be set into pendular motion by the pressure of the muscles of the cyclist's arms.

Another characteristic of the mechanism derives from the fact that the range of angular movement that can be set for the handle-bar is adjustable, within pre-established limits, so that it is proportional to the degree of slope and roughness of the road surface as well as to the physical energy available.

The mechanism furthermore comprises locking/unlocking means for fixing/removing it to/from the handlebar, in two different positions.

According to a variant, the transmission of the swinging movement that can be given to the handlebar by means of multiplier gears and a chain, is conveyed to a free wheel fixed to the front wheel.

The advantages deriving from the use of the mechanism according to the invention, said mechanism offering limited weight and production costs, are considerable both for bicycles in use on rough surfaces and for bicycles used on normal roads as well as on the well-known "cyclettes" used for physical exercise.

The invention is described in detail below with reference to the drawings attached for illustrative purposes in which the various figures are on a variable scale.

FIG. 1, on a reduced scale, represents a bicycle provided with the mechanism according to the invention;

Figure 6:
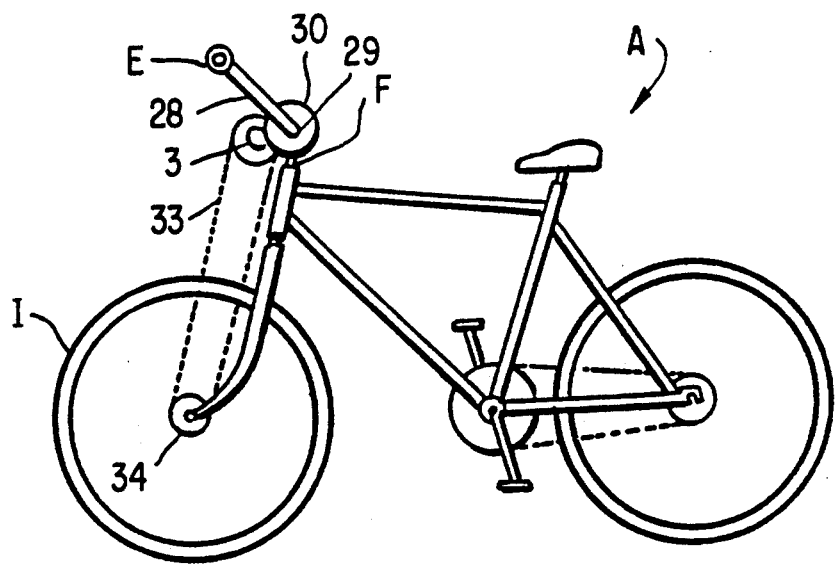
Figure 7:
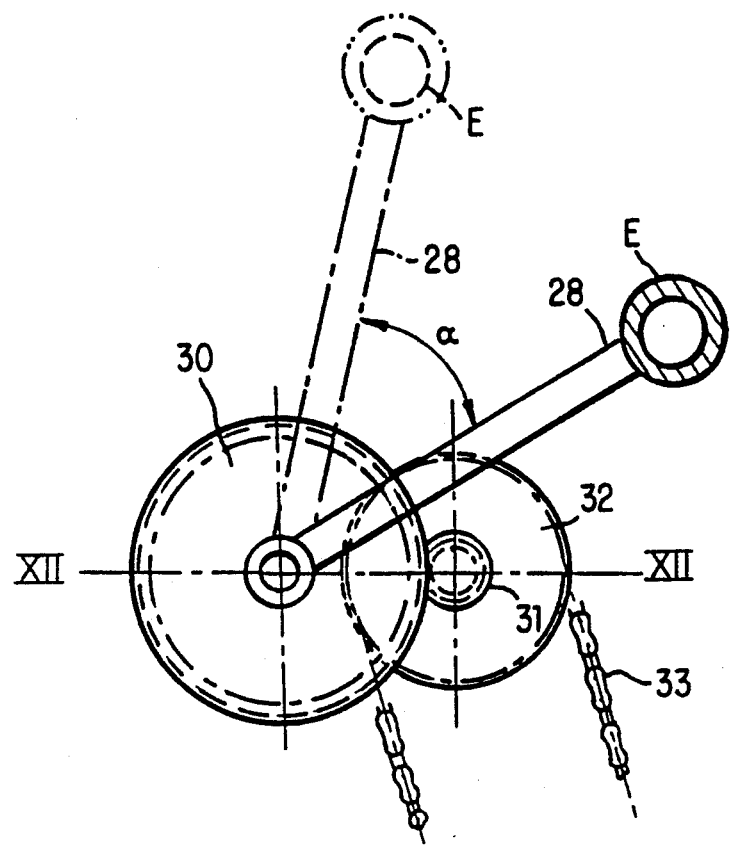
Figure 8:
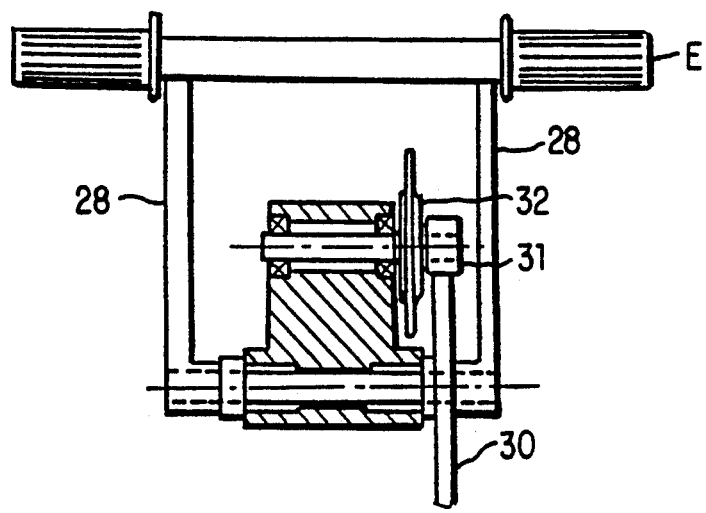

FIG. 6 schematically illustrates, in a side view, a bicycle to which a structural variant of the mechanism has been applied for the activation of the front wheel of same;

FIG. 7 is an enlarged particular of the mechanism according to FIG. 6;

FIG. 8, on a different scale, is a view of the particular in FIG. 11 sectioned according to line XII—XII of FIG. 11.

Figure 1:
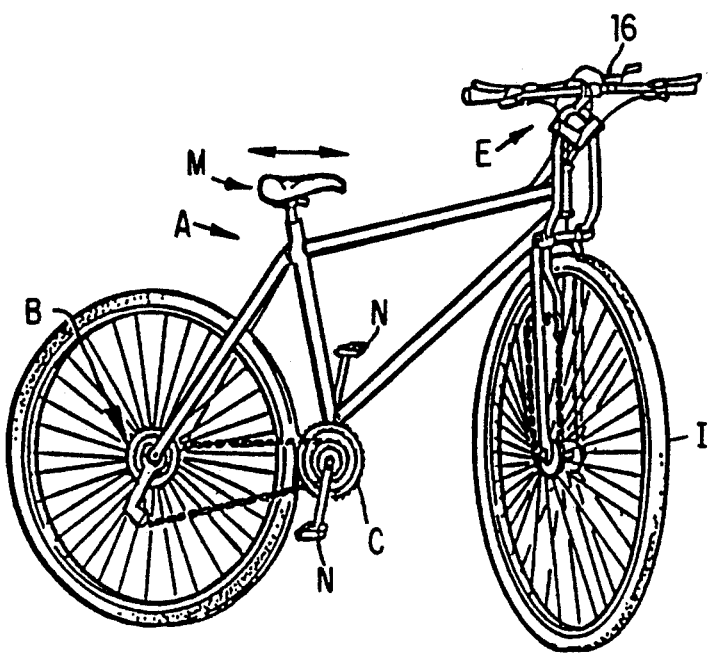
Figure 2:
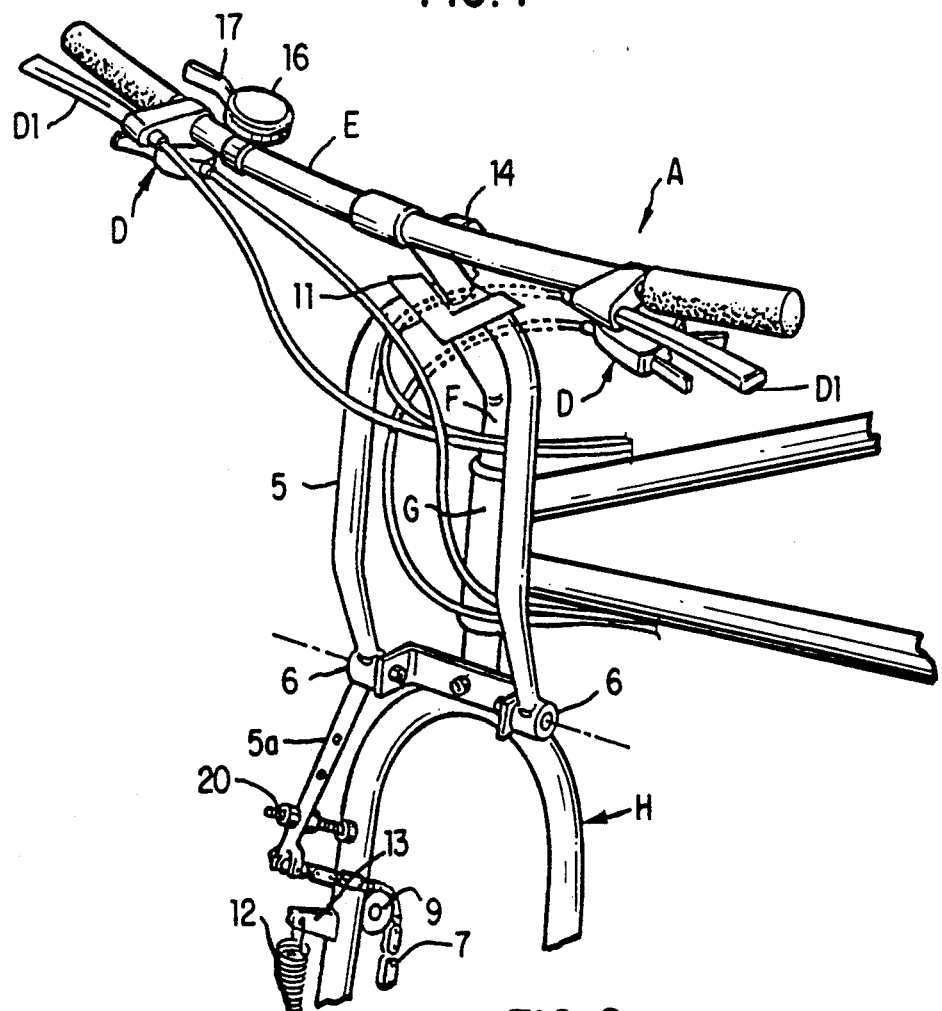
FIG. 2 is a view on a larger scale of the front part of the bicycle in FIG. 1.

In FIGS. 1–4 of the drawings, the is shown a handlebar (E) of a bicycle (A). In FIGS. 1 and 2, there are shown command levers (D1,D2) which are used to select gears (B,C) and to apply brakes to the wheels.

Figure 4:
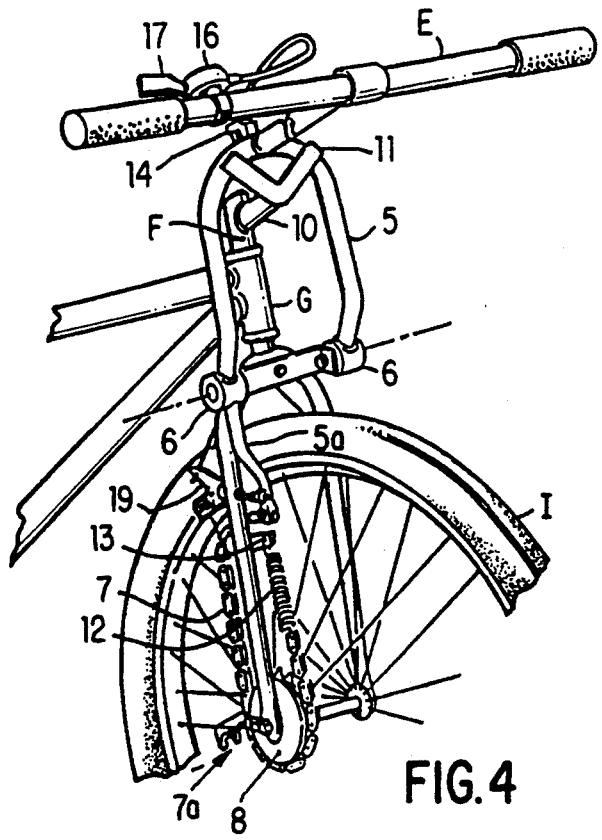
FIG. 4 is a further view of only the front part of the bicycle considered from a different angle than that in FIGS. 2 and 3.

According to the invention a handle-bar E, of any suitable form, is fixed to the top of an up-side-down "U" shaped lever 5 hinged at 6 with respect to the sides of the front fork H. In the embodiment illustrated, the lever 5 is provided with asymmetrical branches, one of which 5a is longer, than the other and the extremity of which is pivotally attached to one of the ends of a portion of a chain 7 which engages the toothed driving crown of a free wheel 8. As seen in FIG. 4, claim 7 passes astride an idler pulley 9 and is fixed to a return spring 12, anchored at point 13 with respect to the fork H.

The driven part of the free wheel 8 is coaxially fixed to the front wheel I.

Figure 3:
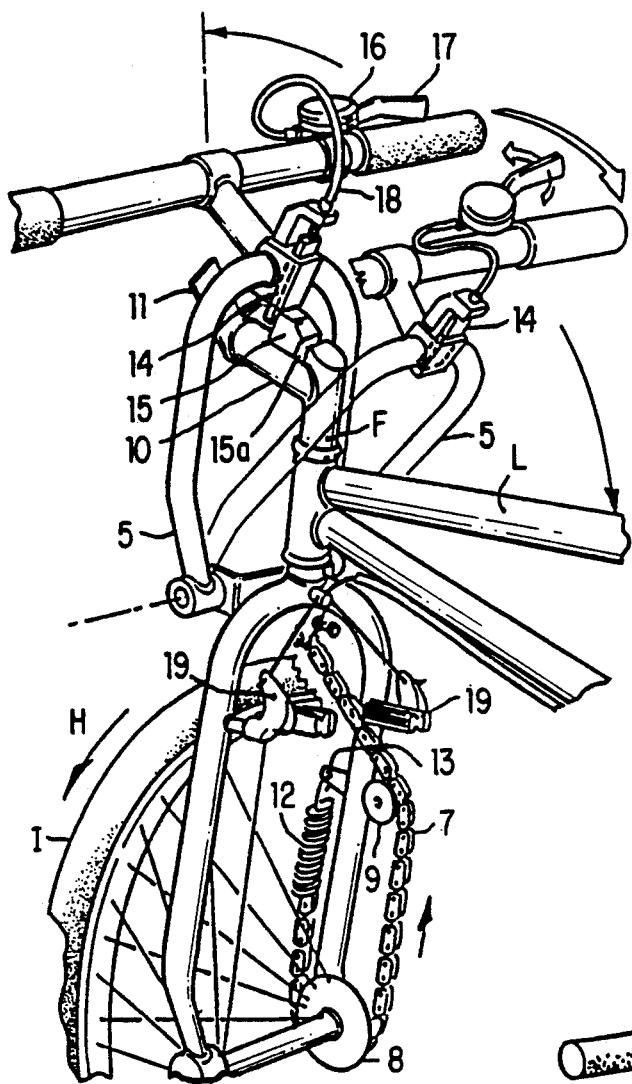
FIG. 3 is another view of the same front part considered from a different angle, with the handlebar both in the normal position and in the swung position.

The steering column F is provided with an extending arm 10, FIGS. 2, 3 and 4, having strip 11 which define the front position of the lever 5 and of the handle-bar E. The stopping means 11, FIG. 9, can be advantageously provided with a block 26 made of a moderately elastic material, or with a spring, in order to allow for a cushioned swing of the handle-bar beyond the normal position.

The lever 5, together with the handle-bar E, oscillates around the transverse axis of the hinge 6 and can be blocked with respect to the fork H by the stopping means 11 and the mobile tooth of a catch 14, fixed to the lever 5. The tooth of said catch, under the thrust of elastic means, frontally engages a fixed stop 15 attached to the steering column F, in which case the handlebar is captured in the normal running position. If the tooth of the catch is positioned in notch 15a, FIG. 3, the handlebar takes up a position further back which is more suitable for riding downhill. A control lever actuated mechanism 16, 17 is mounted on to the handle-bar E, said mechanism having two fixed positions, and connected to a "Bowden" cable for extension, and retraction, of the mobile tooth of the catch 14.

The maximum width of the swinging movement that can be set to the handle-bar is defined by an angle α the limits of which are set by the stopping means 11 and by the flexible steel cable 27, FIG. 9, of a suitable length, connected to the steering column F and, respectively, to the swinging lever 5.

The saddle M, FIG. 1, is provided with a control, underneath its cover, which allows for its adjustment, not only in height but also longitudinally, so as to be adapted to the height of the cyclist and also to the range of the angular movement that can be given to the handlebar.

In FIG. 3, 19 indicates one of the two shoes of the brake for the front wheel mounted beside the fork H both so as not to interfere with the chain 7 and the spring 12 and because, in this position, the braking action amplied to the tire of the wheel I is considerably improved.

In FIG. 2, 20 indicates an adjustable stop for the branch 5a of the lever 5. Substantially the handlebar E, the lever 5 fixed to it and the leg 5a make up a first lever for setting the front wheel I into motion.

Operation of the mechanism is intuitive; in fact when the cyclist so desires, by manewvering the lever 17 of the control 16, he can remove the handle-bar E from the stopping means 15 and, after having adjusted the longitudinal position of the saddle M, he can apply adequate force to the handle-bar causing it to oscillate in the opposite direction with respect to the direction of travel. This movement, which constitutes the active phase of each cycle of activation of the front wheel I, by means of the lever 5, 5a, chain 7 and free wheel 8, is transmitted to the front wheel I in the form of driving power which is added to the driving power transmitted to the rear wheel by means of the pedals N. When the active oscillation phase ceases, so does the force applied to the handlebar. The retraction of the spring 12, previously extended, causes the rapid return of the handlebar the lever 5 to a position against the stopping means 11 or block 26; this second phase, inactive for driving front free wheel 8, defines one of a plurality of work cycles.

To return to normal running only with use of the pedals, it is sufficient to manewver the control 16, 17 and unblock the tooth of the catch 14. When the handlebar reaches the initial position, with the part 5 against the stop 11 or block 26, the tooth of the catch, pushed by a spring, clicks into the notch 15a and so remains blocked in the position of normal use with respect to the fork H.

The free front wheel 8 also functions so as to avoid the spontaneous reverse of the bicycle. This is particularly an advantage when riding uphill.

A bracket 7a is fixed to the front fork H (see FIG.1) FIG. 4. If it is desired to neutralize the action of the free wheel 8 it is sufficient to unblock the chain 7 from said free wheel 8 and place it on the bracket 7a. The spring 12 facilitates the removal and/or remounting of the chain 7 on the free wheel 8.

Figure 5:
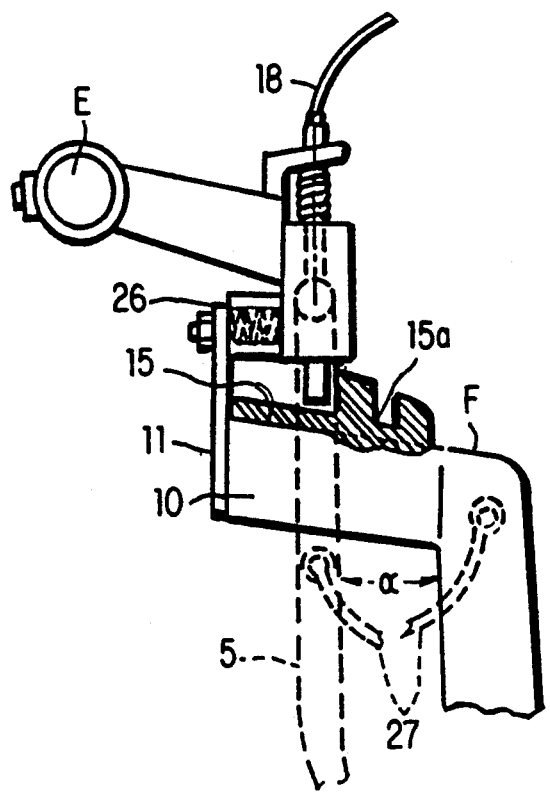
FIG. 5 is a side view relating to the front stopping means at the end of the return run of the handlebar.

In FIG. 5, 26 indicates a shock absorber such as a block of elastomeric material or a suitably shaped and structured spring, which acts as a stop and damper for the impact of the handle-bar E during the angular return movement. Furthermore, the position of the handlebar illustrated in FIG. 5 is advantageous for downhill riding in that the damping capacity of the strap 26 absorbs most of the vibrations generated by the front wheel in contact with the roughness of the ground. These damped vibrations are transmitted from the handlebar to the hands and to the arms of the cyclist.

27 indicates a flexible steel cable, having an adjustable length whose opposite ends are respectively anchored to the lever 5 and to the steering column F. By suitably adjusting the length of this cable, the cyclist varies the width of the angle of oscillation of the handle-bar E, within pre-established limits, in proportion to the presure of his arms.

In the embodiment of the mechanism illustrated in FIGS. 6, 7 and 8, the handle-bar E of the bicycle A is fixed to a lever arm 28, hinged angularly mobile at 29 to the steering column F together with a toothed wheel 30 permanently engaged to a cog wheel 31 fixed to a second toothed wheel 32 the crown being engaged by a roller chain 33 which also engages the free wheel 34 mounted on the hub of the front wheel I.

A swinging movement having a pre-established width of $\alpha$ can be given to the handle-bar. Either movement being limited by suitable stops. The return of the handlebar to the position as per FIG. 1 is caused by the reaction of a resilient device. A device for the temporary blockage of the handlebar in the position as per FIG. 1 is provided.

The construction of this embodiment, which includes some of the structure described in relation to FIGS. 1 to 5, does not differ from what has been previously described and, thanks to its structural simplicity, offers advantages deriving from the little space it requires and from limited construction costs.

From the above, due to the use of the mechanism according to the invention, the cyclist has a wide range of choice. For example, he can combine pressure on the pedals with pressure of the arms, thereby making both wheels drive wheels. He can choose from among the various positions that can be given to the handlebar that which, from time to time, is most suitable. Furthermore it is also possible to use only the front wheel as the drive wheel, temporarily stopping movement of the pedals. And finally, it is possible to remove the chain 7 from the free front wheel 8 and, by means of the catch 14, block the handlebar at the end of any swinging movement phase, and return to the use of only the rear wheel.

The leg 5a of the lever 5, (FIGS. 1 to 5) can advantageously be provided with more than one point for attaching the chain 7 in order to obtain a variable transmission ratio of the wheel I.

Figure 4A:
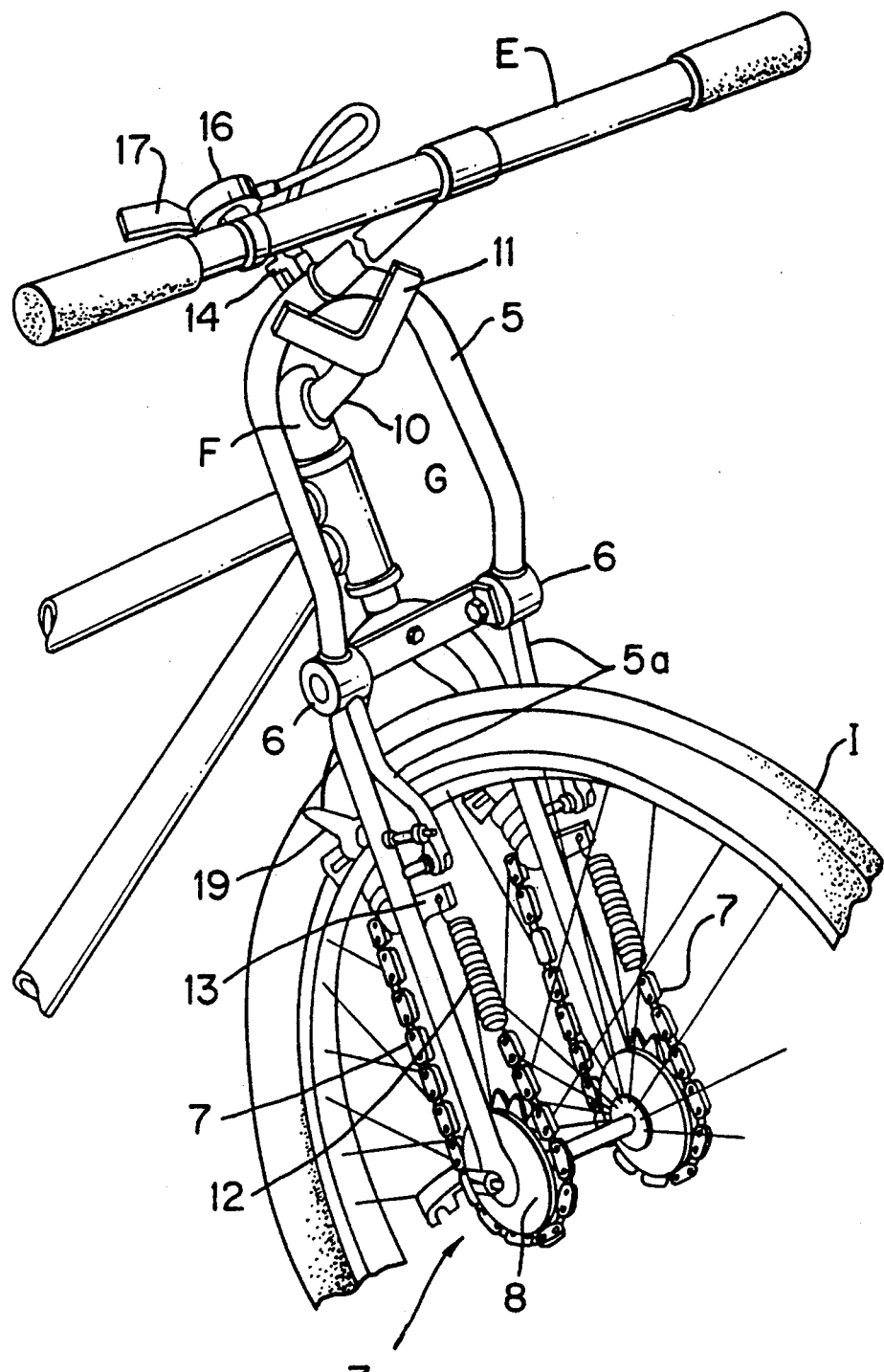
FIG. 4a is a variation of the embodiment of the invention shown in FIG. 4.

Furthermore, it is intuitive that the lever 5 can be provided with a pair of symmetrical branches 5a, connected to single portions of chain associated with corresponding free wheels, juxtaposed and coaxial with respect to the front wheel as shown in FIG. 4a which has reference numerals corresponding to those of FIG. 4. This solution can be advantageously used during the oscillating movement phases given to the handle-bar and for using the mechanism on vehicles provided with handlebar two idle front wheels; in the latter case the lever 5, 5a should be of an appropriate shape and size, consistent with the distance between the parallel branches.

We claim:

1. In a bicycle having a frame including a sleeve, a steering column having an upper segment journalled in said sleeve and a lower segment with a downwardly directed fork, and a handle bar and an idle front wheel connected to said steering column at opposite ends for rotation relative to said frame about the axis of said steering column, the improvement comprising hinge means mounted on said steering column, lever means connected to said hinge means for rotation relative to said steering column, said handle bar being mounted on said lever means, a catch mounted on said lever means, said catch having a slidable tooth and actuating means for moving said tooth between an extended position and a retracted position, a first stop mounted on said steering column for limiting rotation of said lever means relative to said steering column, said first stop being engageable with said tooth when said tooth is in said extended position but not when said tooth is in said retracted position, a first free wheel mounted coaxially and in driving engagement with said front wheel, a first chain means in engagement with said free wheel and having one end connected to said steering column and another end connected to said lever means for imparting rotational motion to said first free wheel for driving said front wheel when said lever means is rotated relative to said steering column, and said first stop comprising latching means mounted on said steering column for snugly receiving said tooth when in the extended position to prevent movement of said lever means relative to said steering column when said front wheel is not to be driven.

2. An improved bicycle according to claim 11 wherein said lever means is in the general shape of an inverted U with two parallel legs one of which is longer than the other, the handlebar being mounted on the lever means adjacent the closed end of the U, both legs of said lever means being connected to said hinge means, and a portion of the longer leg extending away from said handlebar beyond said hinge means whereat said first chain means is connected to said lever means.

3. An improved bicycle according to claim 12 wherein said portion of the longer leg extending away from said handlebar beyond said hinge means has a plurality of attachment means along its length, each one of said attachment means being adapted to receive said first chain means for varying the ratio of transmission of power from said lever means to said front wheel.

4. An improved bicycle according to claim 2 wherein said hinge means is mounted adjacent the upper end of said fork.

5. An improved bicycle according to claim 4 further comprising bracket means mounted on said steering column adjacent the lower end of said fork for receiving said first chain means upon disengagement of said chain means from said first free wheel.

6. An improved bicycle according to claim 1 wherein said latching means is disposed on a rearward end of said first stop.

7. An improved bicycle according to claim 1 further comprising a second stop mounted on said steering column in front of said first stop and in front of said lever means for limiting forward rotation of said lever means, and a resilient member mounted on said second stop between said lever means and said second stop for dampening vibrations transmitted from said steering column to said frame.

8. An improved bicycle according to claim 1 wherein said lever means is in the general shape of an inverted U with two parallel legs of substantially equal length, the handlebar being mounted on the lever means adjacent the closed end of the U, both legs of said lever means being connected to said hinge means, and further comprising a second free wheel mounted coaxially and in driving engagement with said front wheel on the side opposite said first free wheel, and a second chain means in engagement with said second free wheel and having one end connected to said steering column and another end connected to said lever means for imparting rotational motion to said second free wheel for driving said front wheel when said lever means is rotated relative to said steering column, the lower portion of each leg extending away from said handlebar beyond said hinge means and being respectively connected to said first and second chain means.

* * * * *